(12) United States Patent  
Ashwood-Smith et al.

(10) Patent No.: US 7,995,569 B2
(45) Date of Patent: Aug. 9, 2011

(54) VIRTUAL ROUTERS FOR GMPLS NETWORKS

(75) Inventors: Peter Ashwood-Smith, Hull (CA); Darek Skalecki, Kanata (CA); Gerard Swinkels, Ottawa (CA); David Miedema, Ottawa (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 599 days.

(21) Appl. No.: 11/338,118

(22) Filed: Jan. 23, 2006

(65) Prior Publication Data

US 2006/0221981 A1    Oct. 5, 2006

Related U.S. Application Data

(60) Provisional application No. 60/667,411, filed on Apr. 1, 2005.

(51) Int. Cl.
*H04L 12/50* (2006.01)
*H04L 12/28* (2006.01)

(52) U.S. Cl. ...................................... 370/380; 370/401

(58) Field of Classification Search .................. 370/238, 370/252–256, 351, 380, 386–389, 392, 400, 370/401
See application file for complete search history.

(56) References Cited

U.S. PATENT DOCUMENTS

| | | | |
|---|---|---|---|
| 6,570,873 B1 * | 5/2003 | Isoyama et al. | 370/375 |
| 6,836,463 B2 * | 12/2004 | Garcia-Luna-Aceves et al. | 370/238 |
| 7,190,898 B2 * | 3/2007 | Kim et al. | 398/51 |
| 7,382,731 B1 * | 6/2008 | Zhao et al. | 370/236 |
| 2002/0191541 A1 * | 12/2002 | Buchanan et al. | 370/230 |
| 2003/0067880 A1 | 4/2003 | Chiruvolu | |
| 2003/0147402 A1 * | 8/2003 | Brahim | 370/395.53 |
| 2003/0147645 A1 * | 8/2003 | Imajuku et al. | 398/7 |
| 2004/0095922 A1 * | 5/2004 | Sasagawa | 370/351 |
| 2004/0218536 A1 * | 11/2004 | Yasukawa et al. | 370/238 |
| 2004/0264960 A1 | 12/2004 | Maciocco et al. | |
| 2005/0105905 A1 * | 5/2005 | Ovadia et al. | 398/47 |
| 2005/0163101 A1 * | 7/2005 | Ashwood Smith et al. | 370/351 |
| 2005/0265308 A1 * | 12/2005 | Barbir et al. | 370/351 |
| 2006/0018313 A1 | 1/2006 | Oki et al. | |
| 2006/0209677 A1 * | 9/2006 | McGee et al. | 370/216 |

OTHER PUBLICATIONS

Banerjee, A. et al.; "Generalized Multiprotocol Label Switching: An Overview of Routing and Management Enhancements"; IEEE Communications Magazine, Jan. 2001; 7 pages.
Rosen, E. et al.; "Multiprotocol Label Switching Architecture"; RFC 3031; Jan. 2001; 63 pages.
Ash, J. et al.; "LSP Modification Using CR-LDP"; RFC 3214; Jan. 2002; 11 pages.
Anderson, L.; "The Multiprotocol Label Switching (MPLS) Working Group Decision on MPLS Signaling Protocols"; RFC 3468; Feb. 2003; 11 pages.
Berger, L.; "Generalized Multi-Protocol Label Switching (GMPLS) Signaling Functional Description"; RFC 3471; Jan. 2003; 34 pages.
Berger, L.; "Generalized Multi-Protocol Label Switching (GMPLS) Signaling Resource Reservation Protocol-Traffic Engineering (RSVP-TE) Extensions"; RFC 3473; Jan. 2003; 42 pages.
Berger, L.; "GMPLS Signaling Procedure for Egress Control"; RFC 4003; Feb. 2005; 5 pages.

* cited by examiner

*Primary Examiner* — Hong Cho
(74) *Attorney, Agent, or Firm* — Guerin & Rodriguez, LLP

(57) ABSTRACT

Virtual routers that abstract photonic sub-domains are provided for GMPLS networks. A virtual router uses a link viability matrix to keep track of the set of viable connections between inputs and outputs of a photonic sub-domain. A virtual router may receive RSVP-TE signaling messages and either allocate a working input to output link pair or, if explicitly signaled, verify that the requested link is currently viable. A virtual router also advertises, in its link state updates, the current set of possible outputs for any input link. Shortest path computations can be implemented utilizing virtual routers by modifying a topology graph in accordance with the link viability matrix of the virtual router.

20 Claims, 3 Drawing Sheets

VIRTUAL ROUTERS FOR GMPLS NETWORKS

RELATED APPLICATION

This application claims the benefit of the filing date of U.S. Provisional Application; Ser. No. 60/667,411; filed Apr. 1, 2005; entitled "GMPLS path computation constraints to address blocking/abstract GLSR," the entirety of which provisional application is incorporated herein by reference.

FIELD OF THE INVENTION

The present invention relates generally to interfacing GMPLS architectures to photonic sub-domains. More particularly, the present invention relates to abstracting a photonic sub-domain as a virtual GLSR.

BACKGROUND AND SUMMARY OF THE INVENTION

Due to the explosive increase in the number of Internet users and various new services, traffic volume is increasing dramatically every year. This trend will likely continue since novel network applications like VoIP and Video on Demand are emerging. These types of services are difficult to realize on the existing best effort type IP network. Accordingly, enterprise users, which employ various network applications, utilize more dedicated network services like IP-VPN and Ethernet as well as the leased-line service. This suggests the need for an adaptive network control mechanism that offers various transmission speeds and levels of communication quality to support user demands and new applications in the next generation networks. MultiProtocol Label Switching ("MPLS") and Generalized MPLS ("GMPLS") technologies are the key contenders to achieve this adaptive network control mechanism. MPLS realizes traffic control in the IP network. Using the circuit switching concept seen in the telephone network, it establishes and handles traffic flows that satisfy different service quality demands. At present, MPLS technology is being used to realize traffic management in Internet service providers and to realize IP-VPN services. GMPLS is a new control technology designed for the next-generation photonic networks. GMPLS extends MPLS to encompass time-division (for example, SONET ADMs), wavelength (that is, optical lambdas), and spatial switching (for example, incoming port or fiber to outgoing port or fiber). GMPLS represents a natural extension of MPLS to allow MPLS to be used as the control mechanism for configuring not only packet-based paths, but also paths in non-packet based devices such as optical switches, TDM muxes, and SONET ADMs. GMPLS enables unified control management of the network layers (packet/TDM/wavelength/optical fiber). The use of GMPLS unifies network operations which promises to yield significant network operation cost reductions. The GMPLS architecture is designed to permit a router to act as an edge device, that is, a Generalized Label Edge Router ("GLER"), into a lambda, fiber, or TDM switched core of Generalized Label Switch Routers ("GLSRs"). For a GLER to initiate paths, the GLER must be able to compute a viable path through the core and subsequently signal the path via GMPLS Signaling Resource ReserVation Protocol—Traffic Engineering ("RSVP-TE") with a high degree of probability that the path will be viable. In other words, the edge routers must have a reasonable view of the topology to request a path in the first place.

The present invention addresses this, and other issues, by providing virtual routers for GMPLS networks that abstract photonic sub-domains. A virtual router uses a link viability matrix to keep track of the set of viable connections between inputs and outputs of a photonic sub-domain. A virtual router may receive RSVP-TE signaling messages and either allocate a working input to output link pair or, if explicitly signaled, verify that the requested link is currently viable. A virtual router also advertises, in its link state updates, the current set of possible outputs for any input link. Shortest path computations can be implemented utilizing virtual routers by modifying a topology graph in accordance with the link viability matrix of the virtual router.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not meant to limit the scope of the invention. For clarity, not every element may be labeled in every figure. The drawings are not necessarily to scale, emphasis instead being placed upon illustrating the principles of the invention.

DETAILED DESCRIPTION OF THE INVENTION

Figure 1:
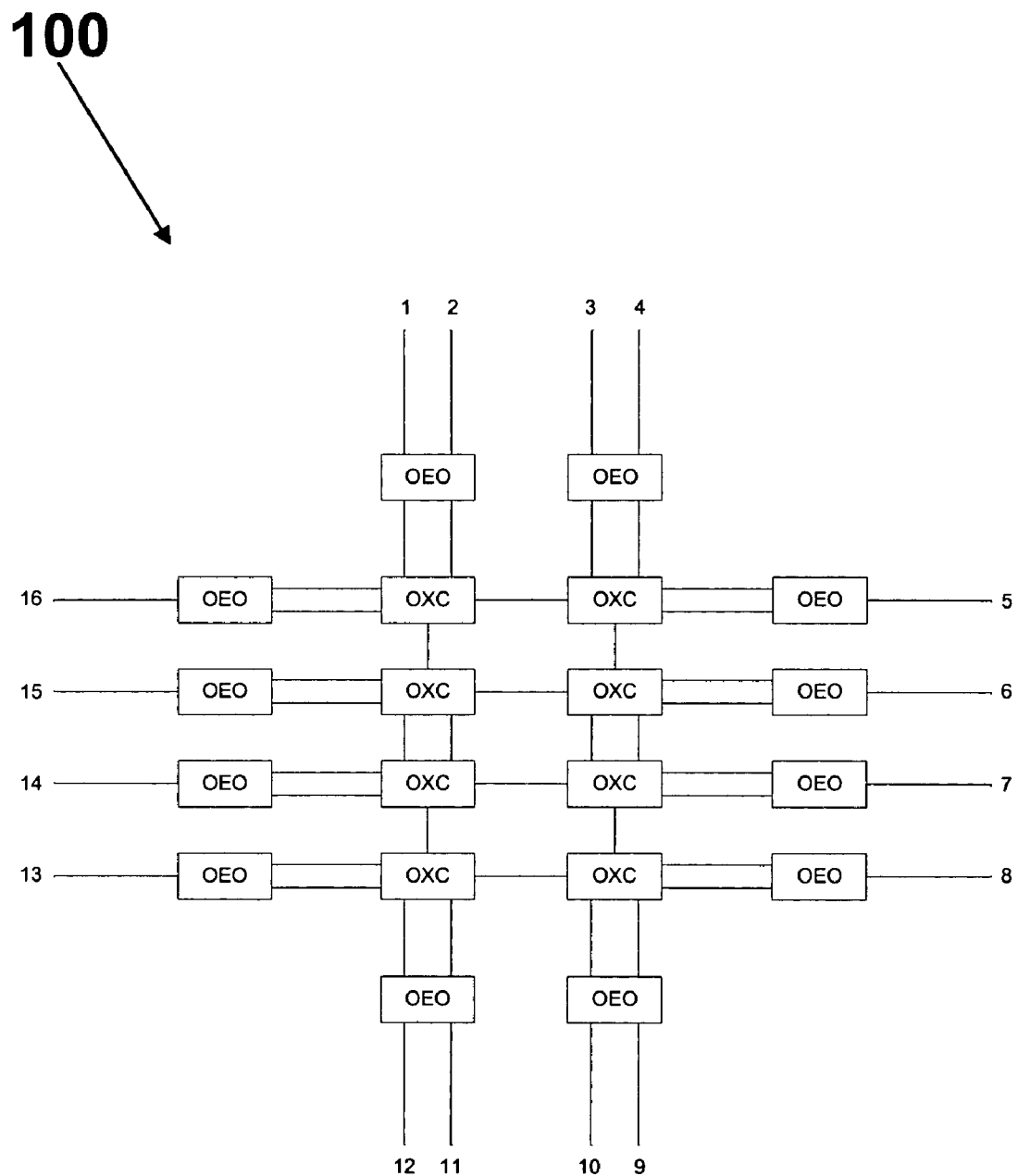
FIG. 1 illustrates an example of a photonic sub-domain that can be abstracted in a virtual GLSR in accordance with the present invention.

The normal mechanisms of MPLS traffic engineering also apply to GMPLS where the router uses a Constraint-based Shortest Path First ("CSPF") algorithm. CSPF is a slightly modified Dijkstra algorithm. Although CSPF algorithms are known in the art, there is no standard CSPF. Generally, CSPF executes on an ingress (or source) router and calculates an Explicit Route ("ER") to a destination, based on specific Label Switched Path ("LSP") constraints, using a Traffic Engineering Database ("TED") (also referred to as a topology database or a topology graph). The resulting ER can then be used by RSVP-TE or Constraint-based Label Distribution Protocol ("CF-LDP") to set up LSPs. CSPF is similar to a normal Shortest Path First algorithm, except during link examination, it rejects links that do not meet a constraint, such as links without capacity, or links that do not match color constraints or configured policy. In general, CSPF calculates the shortest lowest-cost path that conforms to the constraint criteria.

Such CSPF style algorithms and data are generally sufficient to deal with most path computation problems encountered with statistical multiplexors and time-division-multiplexed ("TDM") switching. However, when fiber and wavelength switching are considered, far more data is required to compute viable photonic paths. For example, computing whether a photonic path is viable from some laser to some detector, requires careful consideration of many factors, including most, if not all, of the following: distance and signal-to-noise ratio; wavelength; fiber type; amplifier location, type and gain; laser type; detector type; number of switching points; loss per switching point; and all other LSPs that traverse every segment and their power levels. Each of these types of factors presents difficulties for a CSPF algorithm because the optimum or even a viable solution is likely to require substantially more than the O(nlogn) run-time of a typical CSPF algorithm and would require detailed physics based models of each device and all the LSPs currently placed in the network and advertisements of those parameters. The physics of each device is highly dependent on the given manufacturer and will vary over the lifetime of the component. It is none-the-less possible to run detailed physical models of a photonic domain of many interconnected photonic devices and compute with a high degree of certainty the viability of any given path, it is probably however pre-mature to attempt to standardize all of these attributes and the algorithms required to optimize based on those attributes because they are highly vendor specific and are likely to change quickly as new advances in photonics are made.

A photonic network spanning hundreds or thousands of kilometers, with amplifiers, optical cross connectors ("OXCs"), optical add/drop multiplexers ("OADMs"), and other pure photonic devices can logically be partitioned into regions or sub-domains each of which is represented as an abstract topology with various inputs and outputs. For each photonic sub-domain, there exists an optical controller or set of optical controllers which have the ability to talk directly to all of the devices in its domain and to manipulate any of their controllable parameters. For example, the controller(s) can adjust amplifier gain, can establish input output switching relationships for the OXCs, can control add/drop properties of OADMs, etc. The controllers can further predict, for any input fiber/wavelength, what are the possible output fiber/wavelength possibilities. The controller does this by running the detailed physics models of its sub-domain to predict what will work and what will not work and considers all of the factors listed above (and more) to determine a viable set of solutions.

In accordance with the present invention, photonic sub-domains (that is, optical topologies) are abstracted so as to behave as one virtual GLSR. Substantially all the communication devices in photonic sub-domains abstracted in accordance with the present invention will be photonic devices such as amplifiers, OXCx, OADMs, OEOs, etc. In fact, the photonic sub-domains abstracted in accordance with the present invention typically will be pure photonic sub-domains in that all communication devices in the sub-domain will be photonic devices. The virtual GLSR can interact with a standard GMPLS architecture such that routers, GLERs, GLSRs, or PCEs may compute routes that traverse photonic domains with a high degree of certainty that the computed routes will work, making the virtual GLSR compatible with a GMPLS network.

FIG. 1 shows an example of a photonic sub-domain 100 that can be abstracted in accordance with the present invention. The sub-domain 100 comprises 16 input/output ("I/O") connections (labeled 1 through 16) and a number of photonic devices, including Optical-Electrical-Optical ("OEO") devices and Optical Cross Connectors ("OXC"). The 16 I/O connections are connected to the OEOs in any manner known in the art of networking. The sub-domain may have one or more optical controllers (not shown) as is known in the prior art.

A virtual GLSR abstracting the photonic sub-domain 100 includes the one or more optical controllers of the photonic sub-domain 100 Thus, a virtual GLSR has the ability to talk directly to all of the devices in the sub-domain 100 and to manipulate any of their controllable parameters. For example, the virtual GLSR, via the controller(s), can adjust amplifier gain, can establish input output switching relationships for the OXCs, can control add/drop properties of OADMs, etc. The controller(s) can further predict, for any input fiber/wavelength, what are the possible output fiber/wavelength possibilities. The controller does this by running the detailed physics models of the sub-domain 100 to predict what will work and what will not work and considers all of the factors listed above (and more) to determine a viable set of solutions (that is, viable paths through the sub-domain 100). That is, the virtual GLSR, via the controller(s), determines a viable set of viable paths through the sub-domain 100.

The viable solutions determined by the virtual GLSR are updated as the controller detects changes. Thus, the virtual GLSR keeps track of which inputs may be connected to which outputs. The virtual GLSR keeps track of the set of viable connections between inputs and outputs in a link viability matrix ("LVM"). For example, the photonic sub-domain 100 in FIG. 1 has 16 inputs and 16 outputs as each I/O connection can be both an input and an output. A virtual GLSR computes the viability for each I/O pair and enters the result into the matrix. In this manner, the LVM expresses which inputs can be connected to which outputs and represents the blocking state of the virtual GLSR.

Table 1 illustrates a LVM for the photonic sub-domain of FIG. 1. Each row in Table 1 indicates which outputs can be connected to a particular input. A 0 in Table 1 indicates that there is no connectivity between the indicated I/O pair and a 1 indicates that there is connectivity between the I/O pair. For example, Table 1 indicates that input 1 can be connected to each of the outputs 6-16. Each column in Table 1 indicates which inputs can be connected to a particular output. For example, output 15 can be connected to input 1 and input 2. The rows for inputs 3-14 are not shown in Table 1.

TABLE 1

Link Viability Matrix

| | O | | | | | | | | | | | | | | | |
|---|---|---|---|---|---|---|---|---|---|---|---|---|---|---|---|---|
| I | 1 | 2 | 3 | 4 | 5 | 6 | 7 | 8 | 9 | 10 | 11 | 12 | 13 | 14 | 15 | 16 |
| 1 | 0 | 0 | 0 | 0 | 0 | 1 | 1 | 1 | 1 | 1 | 1 | 1 | 1 | 1 | 1 | 1 |
| 2 | 0 | 0 | 0 | 0 | 0 | 0 | 0 | 0 | 0 | 0 | 0 | 0 | 0 | 0 | 1 | 0 |
| . | . | . | . | . | . | . | . | . | . | . | . | . | . | . | . | . |
| . | . | . | . | . | . | . | . | . | . | . | . | . | . | . | . | . |
| 15 | 1 | 1 | 0 | 0 | 0 | 0 | 0 | 0 | 0 | 0 | 0 | 0 | 0 | 0 | 0 | 0 |
| 16 | 1 | 0 | 0 | 0 | 0 | 0 | 0 | 0 | 0 | 0 | 0 | 0 | 0 | 0 | 0 | 0 |

Figure 2:
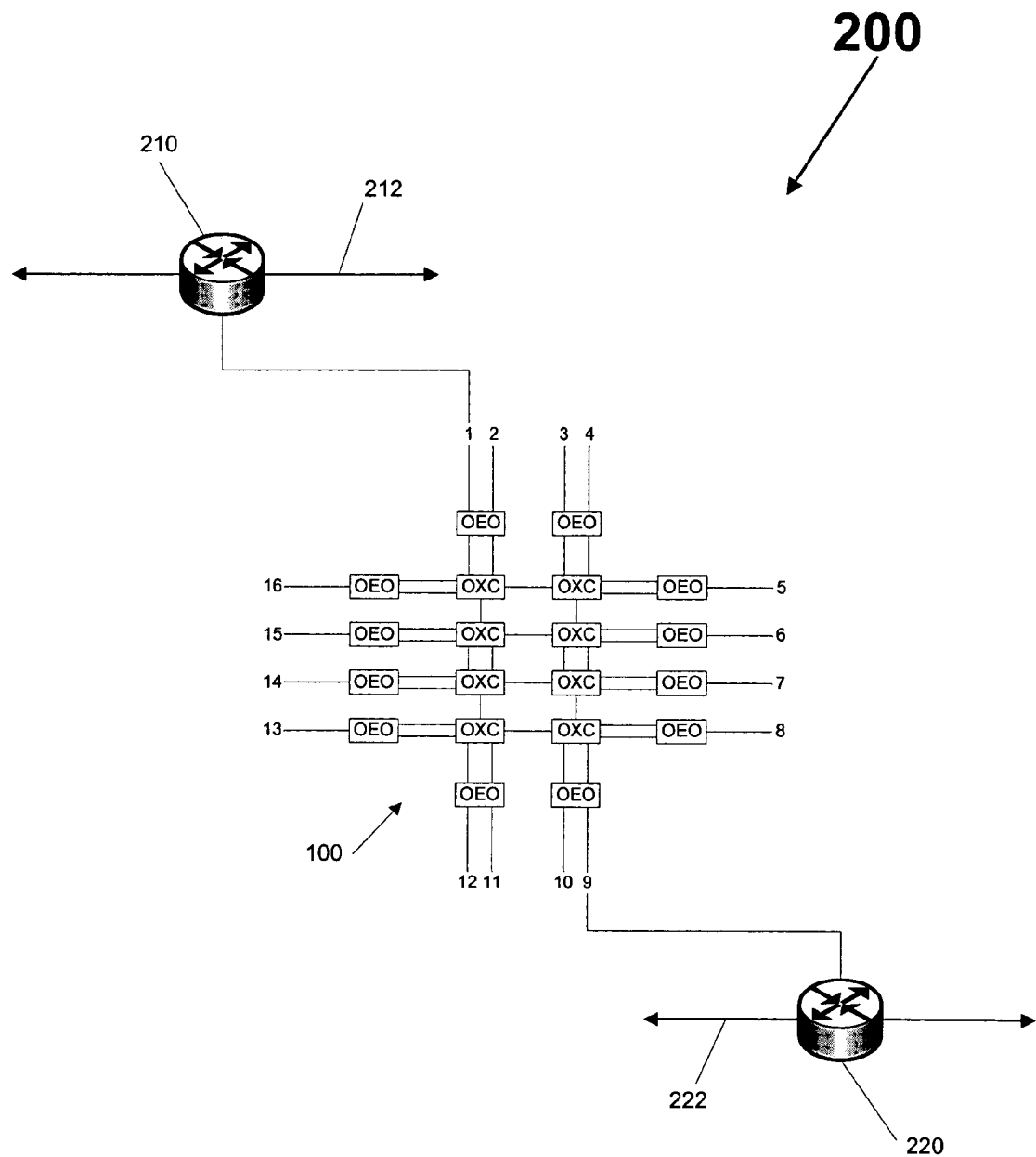
FIG. 2 illustrates an embodiment of a virtual GLSR utilized in conjunction with routers.

FIG. 2 illustrates how the virtual GLSR may be advantageously utilized to abstract the photonic sub-domain 100. In FIG. 2, the photonic sub-domain is connected to a first router 210 via I/O connection #1. The manner of connecting the sub-domain 100 to the router 210 via connection #1 can be any manner known in the art. Routers, such as the first router 210 in FIG. 2, may be connected to the sub-domain 100 via one or more I/O connections. The router 210 utilizes its control plane 212, as is known in the art, in communicating with other communication devices on a network. Similarly, the sub-domain is connected to a second router 220 via I/O connection #9. The second router 220 also utilizes its control plane 222 in communicating with other communication devices on a network.

A virtual GLSR may receive RSVP-TE signaling messages and will either allocate a working input to output link pair or, if explicitly signaled, will verify that the requested link (that is, the I/O pair) is currently viable. Once the virtual GLSR has determined what I/O links are to be used, and that they are viable, it will communicate with the optical sub-components to create the cross connection. The RSVP-TE path message may either wait for confirmation or continue to the next GLSR while the photonic sub-domain operates in parallel to establish the connectivity. The virtual GLSR may optionally configure its optical sub-domain on the reverse RESV message. For example, as a result of RSVP-TE signaling, a virtual GLSR may determine from the LVM in Table 1 that input 1 and output 9 can be connected. The virtual GLSR then communicates with the optical sub-components to establish the connection between input 1 and output 9, effectively establishing a link between the first router 210 of FIG. 2 and the second router 220 of FIG. 2.

GMPLS-TE/CSPF computations assume non-blocking nodes. For example, if a first router can reach an input into one side of a second router, it assumes an output on the other side of the second router also can be reached. That is, the first router assumes the second router is non-blocking. This is not necessarily true with a virtual GLSR. A GLER, router, or PCE, such as the first router 210 or second router 220 in FIG. 2, may not compute a viable path through a photonic sub-domain unless it knows about the input to output link viability and factors the viability into its CSPF computation. Thus, if the first router 210 can reach the virtual GLSR through I/O connection #1, it can not assume that it can reach a particular output from the virtual GLSR (for example, I/O connection #6 ). To remedy this, a virtual GLSR advertises, in its link state updates, the current set of possible outputs for any input link. For example, a virtual GLSR comprising the LVM in Table 1 may advertise that links may be established from input 1 to any of the outputs 6-16. In a preferred embodiment, a GLER, router, or PCE will assume that all output links are viable if the virtual GLSR does not advertise a set of viable output links. This preferred embodiment is consistent with normal (G)MPLS-TE behavior, which implies it's a non-blocking link.

Two methods for advertising link viabilities are presented herein. The first method involves advertising matrix rows and the second method involves advertising only the viable elements of a row. For each of the two methods, preferred embodiments of the present invention will not only advertise which links are viable, but will also advertise the cost of the viable link as well. The advertised cost of a viable link can be incorporated into path computations. Accordingly, preferred embodiments of the present invention comprise link viability matrix that indicates the cost of each viable connection in the LVM. An example of a LVM with costs is shown in Table 2 for a virtual GLSR having 4 inputs and 4 outputs. A cost of 0 (zero) in Table 2 indicates unreachable, as opposed to zero cost. As indicated in Table 2, input 2 does not have a viable link to (that is, cannot be connected to) output 4, has a viable link to output 1 at a cost of 4, and has a viable link to output 3 at a cost of 9.

TABLE 2

Link Viability Matrix with Costs

| I | O | | | |
|---|---|---|---|---|
|   | 1 | 2 | 3 | 4 |
| 1 | 0 | 4 | 2 | 1 |
| 2 | 4 | 0 | 9 | 0 |
| 3 | 2 | 9 | 0 | 1 |
| 4 | 1 | 0 | 1 | 0 |

A first method of advertising link viability involves advertising an entire row of a link viability matrix. Thus, to advertise the link viability for input 2 of Table 2 in accordance with the first method, the entire row is advertised. That is all the elements in the entire row (4, 0, 9, and 0) are advertised. A second method of advertising link viability involves advertising only the viable elements of the row to be advertised. Thus, to advertise the link viability for input 2 of Table 2 in accordance with the second method, only the reachable list (1@cost4, 3@cost9) is advertised. The second method of advertising link viability may be particularly advantageous when the LVM is sparse.

In the event that a GLER, router, or PCE computes a non-viable I/O link pair, the virtual GLSR may return the viable outputs for the given input via a modified crank-back mechanism. The GLER, router, or PCE can then incorporate this crank-back (feedback) data into a subsequent path computation. In this manner, a continuous series of identical mistakes by the GLER, router, or PCE is avoided.

Figure 3A:
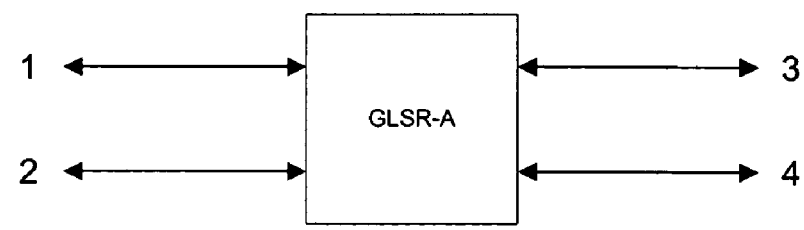
FIG. 3A shows an embodiment of a virtual GLSR in accordance with the present invention.
Figure 3B:
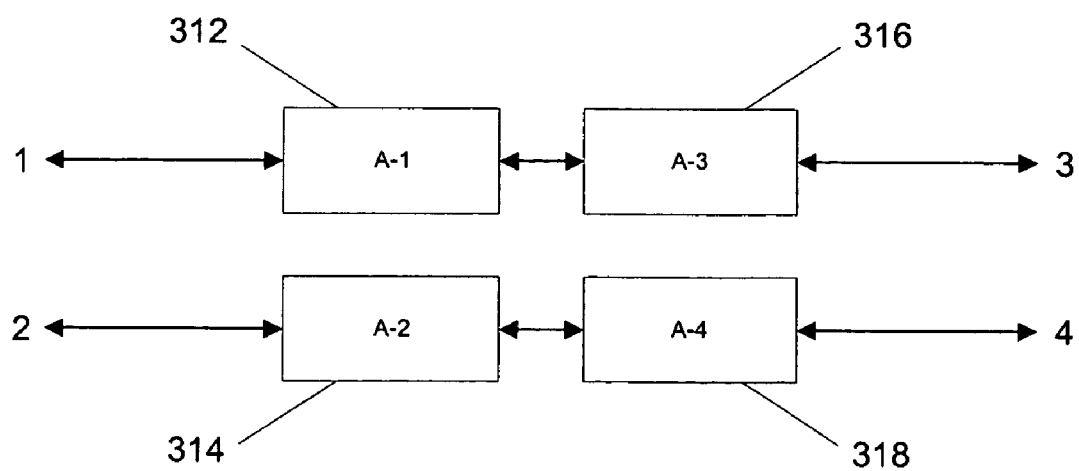
FIG. 3B a portion of a topology graph modified in accordance with the present invention to represent the virtual GLSR of FIG. 3A.

Shortest path computations can be implemented utilizing virtual GLSRs of the present invention. A preferred method is to modify a topology graph (also frequently referred to as a topology database) in accordance with the LVM of a virtual GLSR. This can be done by adding a new node in a topology graph for each I/O connection of a virtual GLSR having a viable link to another I/O connection in the virtual GLSR. For example, FIG. 3A shows a virtual GLSR 300 according to the present invention. The virtual GLSR 300 has four I/O connections labeled 1-4. FIG. 3B illustrates how a topology graph can be modified in accordance with the present invention for the situation when the virtual GLSR 300 is advertising that link #1 (that is, I/O connection #1 ) can only reach link #3 (that is, I/O connection #3 ) and that link #2 (that is, I/O connection #2 ) can only reach link #4 (that is, I/O connection #4 ). As represented in FIG. 3B, four nodes are added to the topology graph. The first node 312 is connected to the rest of the topology (not shown) via link #1 and is connected to the third node 316 via an added link. The third node 316 is connected to the rest of the topology (not shown) via link #3. Similarly, the second node 314 is connected to the rest of the topology (not shown) via link #2 and is connected to the fourth node 318 via an added link. The fourth node 318 is connected to the rest of the topology (not shown) via link #4. It should be noted, that path computations based on this modified topography will produce an Explicit Route Object ("ERO") that contains the added links. However, these added links should be suppressed in the actual ERO sent by RSVP-TE since this mechanism is only to ensure a viable path computation.

Embodiments of the present invention comprise operable logic adapted to perform methods of the present invention. These methods include, for example, creating a link viability matrix, updating a link viability matrix, advertising link viabilities, and modifying topologies. That is, the operable logic executes the methods of the present invention. The operable logic of the present invention can be implemented as a set of computer program instructions that are stored in a computer-readable medium and executed by an embedded microprocessor system within devices made in accordance with the present invention. Embodiments of the invention may be implemented, in whole or in part, in any conventional computer programming language. For example, preferred embodiments may be implemented in a procedural programming language (for example, "C") or an object oriented programming language (for example, "C++"). Alternative embodiments of the invention may be implemented, in whole or in part, utilizing discrete components, integrated circuitry, programmable logic used in conjunction with a programmable logic device such as a Field Programmable Gate Array (FPGA) or microprocessor, or any other means including any combination thereof. Additional embodiments of the invention may be implemented, in whole or in part, as a computer program product for use with a computer system. Such implementation may include a series of computer instructions fixed either on a tangible medium, such as a computer-readable media (for example, a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality described herein with respect to the present invention. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (for example, shrink wrapped software), preloaded with a computer system (for example, on system ROM or fixed disk), or distributed from a server or electronic bulletin board over a network (for example, the Internet or World Wide Web).

Virtual GLSRs of the present invention comprise one or more controllers that execute the operable logic of the present invention. Thus, the operable logic of the present invention also may be referred to herein as control logic. The control logic may be executed on a single controller or may be executed on multiple controllers. Examples of virtual GLSR controllers include photonic controllers of the prior art modified to execute the control logic of the present invention and prior art GLSRs modified to execute the control logic of the present invention.

The present invention as described herein may refer to matrixes, associations, mappings, or correspondences. For example, virtual GLSRs of the present invention comprise a link viability matrix. As is known in the art of implementing operable logic as described above (including the art of computer programming, for example), these, and other, matrixes, associations, mappings, and correspondences typically manifest themselves, for example, either as programming data structures (either separate from or embedded in the operable logic) to keep track of and manipulate the matrixes, associations, mappings, and correspondences or, alternately, can manifest themselves in the procedural aspects of the operable logic itself.

In accordance with the present invention, novel devices and methods embodying a virtual GLSR have been provided. While the present invention has been shown and described herein with reference to specific embodiments thereof, it should be understood by those skilled in the art that variations, alterations, changes in form and detail, and equivalents may be made or conceived of without departing from the spirit and scope of the invention. Accordingly, the scope of the present invention should be assessed as that of the appended claims and by equivalents thereto.

What is claimed is:

1. A virtual router, comprising:
   a photonic sub-domain including a plurality of photonic communications devices, a plurality of inputs, and a plurality of outputs;
   a link viability matrix maintaining track of viable connections and lack of connectivity between input/output (I/O) pairs in the photonic sub-domain, the link viability matrix expressing for each input of the plurality of inputs in the photonic sub-domain whether that input has a viable connection or lacks connectivity to each particular output of the plurality of outputs in the photonic sub-domain; and
   operable logic adapted to create and update the link viability matrix.

2. A virtual router according to claim 1, wherein the link viability matrix indicates a cost for each viable connection in the link viability matrix.

3. A virtual router according to claim 1, further comprising operable logic adapted to advertise link viabilities to GMPLS networks.

4. A virtual router according to claim 1, wherein the virtual router is compatible with a GMPLS network.

5. The virtual router of claim 1, further comprising
   operable logic adapted to transmit a portion of the link viability matrix expressed for a given input over a GMPLS network to a routing element so the routing element can incorporate a viable connection of the given input into a path computation.

6. The virtual router of claim 5, wherein the transmitted portion of the link viability matrix expressed for the given input includes a cost for each viable connection of the given input.

7. The virtual router of claim 5, wherein the transmitted portion of the link viability matrix expressed for the given input omits each unreachable output for the given input.

8. The virtual router of claim 5, wherein the transmitted portion of the link viability matrix expressed for the given input includes each viable connection and each unreachable output for the given input.

9. The virtual router of claim 1, further comprising:
   operable logic adapted to receive an RSVP-TE (Resource Reservation Protocol—Traffic Engineering) message from a routing element on a GMPLS network; and
   operable logic adapted to allocate a viable connection expressed in the link viability matrix to the routing element in response to the RSVP-TE message.

10. The virtual router of claim 1, further comprising:
    operable logic adapted to receive an RSVP-TE message from a routing element on a GMPLS network that requests a particular input-output pair;
    operable logic adapted to verify from the link viability matrix that the particular input-output pair is a viable connection in response to receiving the RSVP-TE message from the routing element; and operable logic adapted to create a cross-connection among the plurality of photonic communications devices in the photonic sub-domain in response to verifying that the particular input-output pair is a viable connection.

11. A method of establishing paths through a photonic sub-domain including a plurality of photonic communications devices, comprising:

representing the photonic sub-domain as a topology having a plurality of inputs and a plurality of outputs;

determining a viability of a connection between each different input/output (I/O) pair; and creating a link viability matrix for maintaining track of viable connections and lack of connectivity between I/O pairs in the photonic sub-domain, the link viability matrix expressing for each input of the plurality of inputs in the photonic sub-domain whether that input has a viable connection or lacks connectivity to each particular output of the plurality of outputs in the photonic sub-domain; and transmitting a portion of the link viability matrix expressed for a given input over a GMPLS network to a routing element so the routing element can incorporate a viable connection of the given input into a path computation.

12. A method according to claim 11, further comprising updating the link viability matrix.

13. A method according to claim 11, further comprising advertising link viabilities to GMPLS networks.

14. The method of claim 11, wherein transmitting a portion of the link viability matrix expressed for a given input includes transmitting a cost for each viable connection of the given input.

15. The method of claim 11, wherein transmitting a portion of the link viability matrix expressed for a given input omits from the transmitted portion each output with which the given input lacks connectivity.

16. The method of claim 11, further comprising:
receiving an RSVP-TE (Resource Reservation Protocol—Traffic Engineering) message from the routing element on the GMPLS network;
allocating a viable connection to the routing element in response to the RSVP-TE message.

17. The method of claim 11, further comprising:
receiving an RSVP-TE message from the routing element on the GMPLS network that requests a particular input-output pair;
verifying from the link viability matrix that the particular input-output pair is a viable connection in response to receiving the RSVP-TE signaling message from the routing element.

18. The method of claim 17, further comprising communicating with the plurality of photonic communications devices in the photonic sub-domain, in response to verifying that the particular input-output pair is a viable connection, to create a cross-connection within the photonic sub-domain.

19. A method for determining a shortest path in a GMPLS network, comprising:

identifying viable connections and lack of connectivity between a plurality of inputs and a plurality of outputs in a photonic sub-domain comprised of a plurality of photonic communications devices;

creating a link viability matrix that expresses for each input of the plurality of inputs in the photonic sub-domain whether that input has a viable connection or lacks connectivity to each particular output of the plurality of outputs in the photonic sub-domain;

receiving a portion of the link viability matrix transmitted over the GMPLS network by one of the photonic communications devices of the photonic sub-domain; and modifying a GMPLS topology graph in accordance with the received portion of the link viability matrix.

20. A method according to claim 19, wherein modifying the topology graph includes adding a node to the topology graph for each I/O in the photonic sub-domain having a viable connection to another I/O in the photonic sub-domain.

* * * * *